(12) United States Patent
Butler et al.

(10) Patent No.: US 7,765,336 B2
(45) Date of Patent: Jul. 27, 2010

(54) AUTONOMOUS MAPPING OF PROTECTED DATA STREAMS TO FIBRE CHANNEL FRAMES

(75) Inventors: Jim Donald Butler, Costa Mesa, CA (US); Joe Chung-Ping Tien, Costa Mesa, CA (US); Daming Jin, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 178 days.

(21) Appl. No.: 11/811,716

(22) Filed: Jun. 11, 2007

(65) Prior Publication Data

US 2008/0307122 A1    Dec. 11, 2008

(51) Int. Cl.
    *G06F 3/00* (2006.01)
(52) U.S. Cl. ............... 710/20; 710/2; 710/3; 710/5; 710/22; 710/31
(58) Field of Classification Search ............... 710/2, 710/3, 5, 20, 22, 31; 709/220, 223
    See application file for complete search history.

(56) References Cited

U.S. PATENT DOCUMENTS

2005/0198531 A1*  9/2005  Kaniz et al. ............... 713/201
2006/0092934 A1*  5/2006  Chung et al. ............... 370/389

* cited by examiner

*Primary Examiner*—Tariq Hafiz
*Assistant Examiner*—Jasjit S Vidwan
(74) *Attorney, Agent, or Firm*—Morrison & Foerster LLP

(57) ABSTRACT

A hardware-based offload engine is disclosed for mapping protected data into frames. For a write operation, the HBA determines host addresses and the size of data to be read from those addresses. The HBA also determines the frame size and protection scheme for data to be written. A frame transmit engine reads each host descriptor in the host data descriptor list to determine the location and byte count of the data to be read. A DMA engine reads the protection information/scratch area to determine the exact data size used to fill each frame and the protection scheme, and retrieves one or more free frame buffers. Check bytes are inserted alongside the data and stored in free frame buffers. After each frame is filled, the frame transmit engine also generates and stores header information for that frame, and then combines header, data and check bytes for transmission over the network.

20 Claims, 6 Drawing Sheets

AUTONOMOUS MAPPING OF PROTECTED DATA STREAMS TO FIBRE CHANNEL FRAMES

FIELD OF THE INVENTION

This invention relates to the transmission of data between a host and a target, and more particularly to a hardware-based offload engine for generating data protection information and mapping protected data into frames in a manner that minimizes the involvement of a local processor.

BACKGROUND OF THE INVENTION

When a host application requests the transmission of Fibre Channel (FC) frames to move data from host memory to a storage system, many preparation steps are needed before the frames can be transmitted over a FC link. It is up to lower levels of abstraction, namely the hardware or onboard firmware of a host bus adapter (HBA) or input/output controller (IOC) to segment the host data into units that are consistent with FC frames and to also insert/delete/pass any necessary protection information into the stream of data. When data is moved from host memory and is protected by protection information, there is a contraction or expansion of the actual data length that must be taken into account when mapping the host data to FC frames.

In previous generations of products, the tasks outlined above were carried out mainly by an integrated processor in the HBA. With the increasing use of protection information such as the T10 protection information standard in data transmission, these tasks and calculations have become increasingly complex and taxing on the processor. As FC link speeds increase, link rates are outpacing the processing power/clock speeds of processors that can be integrated into a microchip.

FIG. 1 illustrates an exemplary conventional system 100 for transferring data between a host computer and targets over a communications network. In FIG. 1, a host computer 102 is capable of sending or receiving data to and from targets 104 connected over a communications network 106 such as a Storage Area Network (SAN). Communications link 108, which enables communications between the host computer 102 and the targets 104, may operate under any one of the known networking protocols such as FC.

The host computer 102 typically includes a host processor 110, host memory 112 for storing application data 114, and a driver 116 for communicating with an IOC or an HBA 118 using a computer system bus 120 such as Peripheral Component Interconnect Express (PCIe). The HBA 118 provides connectivity between the host computer 102 and the targets 104, and typically includes firmware 134 and a local processor 122 such as an Advanced RISC Machines (ARM) processor. In addition, the HBA 118 may also include a Direct Memory Access (DMA) engine 124 and local memory 126. The DMA engine 124 may include hardware operating under the control of the local processor 122, and serves to offload the host processor 110 by performing data transfers to and from the host memory 112 with minimal intervention from the host processor. For example, data to be transferred from the host memory 112 to a target 104 may be formatted and placed in local memory 126 by the DMA engine 124 for subsequent transfer to a target. For frame-based communication links 108, the data (which is not typically arranged in frame-sized blocks) may be formatted into frames using firmware 134 executed by local processor 122 and stored in local memory 126 prior to being transmitted over the link as frames of data 128. The local memory 126 may be organized into contiguous frame-sized blocks for storing frames of data.

In the conventional system of FIG. 1, the local processor 122 had to keep track of the boundaries between frames while formatting the data into frames and storing it into frame-sized blocks. Another engine (not shown in FIG. 1) may be responsible for performing data transfers between the local memory 126 and devices connected over the communications link 108.

The system of FIG. 1, with local processor 122 involvement in the data transfer process, works well for data rates of up to about 4 Gigabits per second (Gbit/sec). However, state of the art networks can operate at speeds of up to 8 Gbit/sec or more, which can be too fast for the local processor 122.

In addition, the T10 protection information standard, the contents of which are incorporated herein by reference, now requires that additional check bytes or data integrity fields (DIFs) 130 be inserted into the data to provide end-to-end data protection and verification. Each check byte 130 may be associated with a certain number of bytes of real data 132, which may correspond to sectors in the disks that store the data. The check bytes 130 are a function of the data they protect, but can be stripped off, passed or inserted after transmission, and stored along with the real data. The size of the protection data 130 (e.g. eight bytes for T10) and real data 132 being protected is configurable, as is the alignment of the protection data 130 within a frame. Therefore, in the context of a write command, these check bytes or protection data 130 must be computed, mapped and inserted into different places within the real data 132 of a frame in accordance with the type of disks in the target that will be storing the data, which may change from frame to frame. In the system of FIG. 1, the T10 protection standard requires that the local processor 122 control the identification of the type of data protection, what data to read from host memory 112 in view of the type of data protection, and where the check bytes are to be placed in the local memory 126 along with the actual data. However, the local processor 122 may not be able to perform these control functions along with formatting the data into frames and keep pace with the speed requirements (link rates) of state of the art networks.

Therefore, there is a need for mapping protected data into frames in a manner that minimizes the involvement of a local processor in a HBA or IOC.

SUMMARY OF THE INVENTION

Embodiments of the invention are directed to a hardware-based offload engine for mapping protected data into frames in a manner that minimizes the involvement of a local processor in a HBA or IOC by implementing mapping control in hardware and memory. By offloading the local processor from having to perform the tasks needed to process outgoing traffic, and raising the level of abstraction at which the processor operates for outbound data streams, the mapping of protected data into frames can be performed at speeds that allow for data rates of 8 Gbits/sec or more to be achieved. In addition, this significantly frees the processor to perform other tasks.

When an application running on the host computer sends a command to the HBA indicating that a read or write operation on host data is requested, firmware in the HBA determines from the host computer the host addresses at which the data resides (or will reside) and the size of the data to be read from or written to those addresses (a byte count), and stores this host descriptor information into a host data descriptor list in random access memory (RAM) in the HBA. For each host descriptor list, the firmware also determines the frame size and the protection scheme for the data to be read or written, and stores this information in a protection information/scratch area in RAM in the HBA.

In the case of a write operation, a frame transmit engine is then initiated by the firmware to perform the autonomous mapping of protected data into frames. The frame transmit engine reads each host descriptor in the host data descriptor list, one at a time, to determine the location and byte count of the data to be read, then issues the location and byte count descriptor to the DMA engine. The DMA engine reads the protection information/scratch area to determine the exact data size used to fill each frame and the protection scheme for that data, determines one or more free frame buffers from a transmit free buffer pool, and automatically retrieves buffer from the free buffer pool. The check bytes are checked and passed, or checked and striped, or inserted in the the appropriate places alongside the data, and stored into the free frame buffers. After each frame is filled by the DMA engine, the frame transmit engine also generates and stores the header information for that frame into a separate area of local memory, and then combines the header, data and check bytes for transmission over the network.

DETAILED DESCRIPTION OF THE PREFERRED EMBODIMENT

Figure 1:
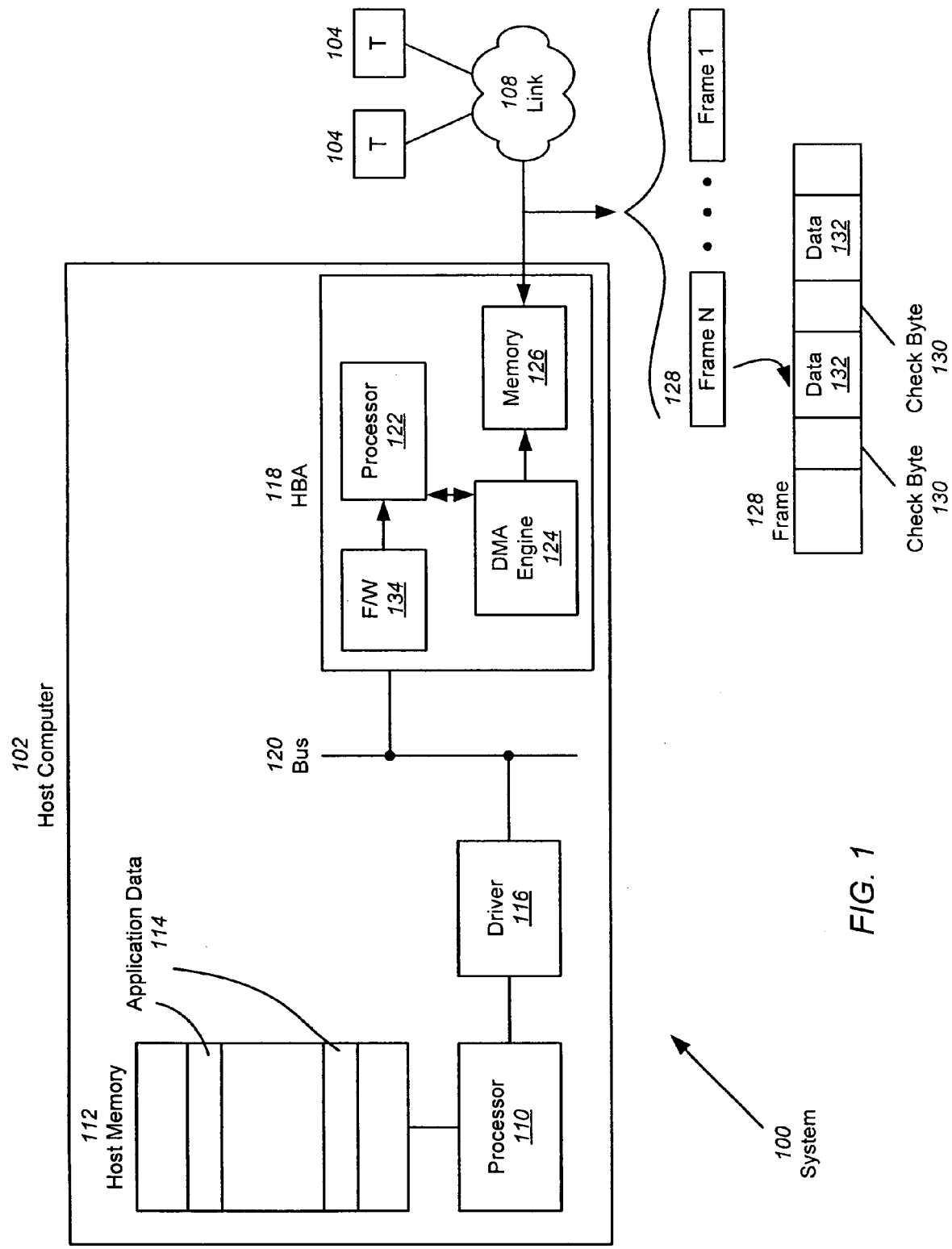
FIG. 1 illustrates an exemplary conventional system for transferring data between a host computer and targets over a communications network.

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the invention are directed to a hardware-based offload engine for mapping protected data into frames in a manner that minimizes the involvement of a local processor in a HBA or IOC by implementing mapping control in hardware and memory. By offloading the local processor from having to perform the tasks needed to process outgoing traffic, and raising the level of abstraction at which the processor operates for outbound data streams, the mapping of protected data into frames can be performed at speeds that allow for data rates of 8 Gbits/sec or more to be achieved. In addition, this significantly frees the processor to perform other tasks.

When an application running on the host computer sends a command to the HBA indicating that a read or write operation on host data is requested, firmware in the HBA determines from the host computer the host addresses at which the data resides (or will reside) and the size of the data to be read from or written to those addresses (a byte count), and stores this host descriptor information into a host data descriptor list in random access memory (RAM) in the HBA. For each host descriptor list, the firmware also determines the frame size and the protection scheme for the data to be read or written, and stores this information in a protection information/scratch area in RAM in the HBA.

In the case of a write operation, a frame transmit engine is then initiated by the firmware to perform the autonomous mapping of protected data into frames. The frame transmit engine reads each host descriptor in the host data descriptor list, one at a time, to determine the location and byte count of the data to be read, then issues the location and byte count descriptor to the DMA engine 224. The DMA engine 224 reads the protection information/scratch area to determine the exact data size used to fill each frame and the protection scheme for that data, determines one or more free frame buffers from a transmit free buffer pool, and automatically retrieves buffer from the free buffer pool. The check bytes are checked and passed, or checked and striped, or inserted in the the appropriate places alongside the data, and stored into the free frame buffers. After each frame is filled by the DMA engine 224, the frame transmit engine also generates and stores the header information for that frame into a separate area of local memory, and then combines the header, data and check bytes for transmission over the network.

Although some embodiments of this invention may be described herein in terms of FC frames being transmitted over a FC link in a storage area network (SAN), it should be understood that embodiments of this invention are not so limited, but are generally applicable to any frame-based networked communications protocol, such as 10 GB Ethernet. In addition, although some embodiments of this invention may be described herein in which the HBA is an initiator, it should be understood that embodiments of this invention are not so limited, but are also generally applicable to systems in which the HBA is a target or intermediate device such as a redundant array of independent disks (RAID) controller.

Figure 2:
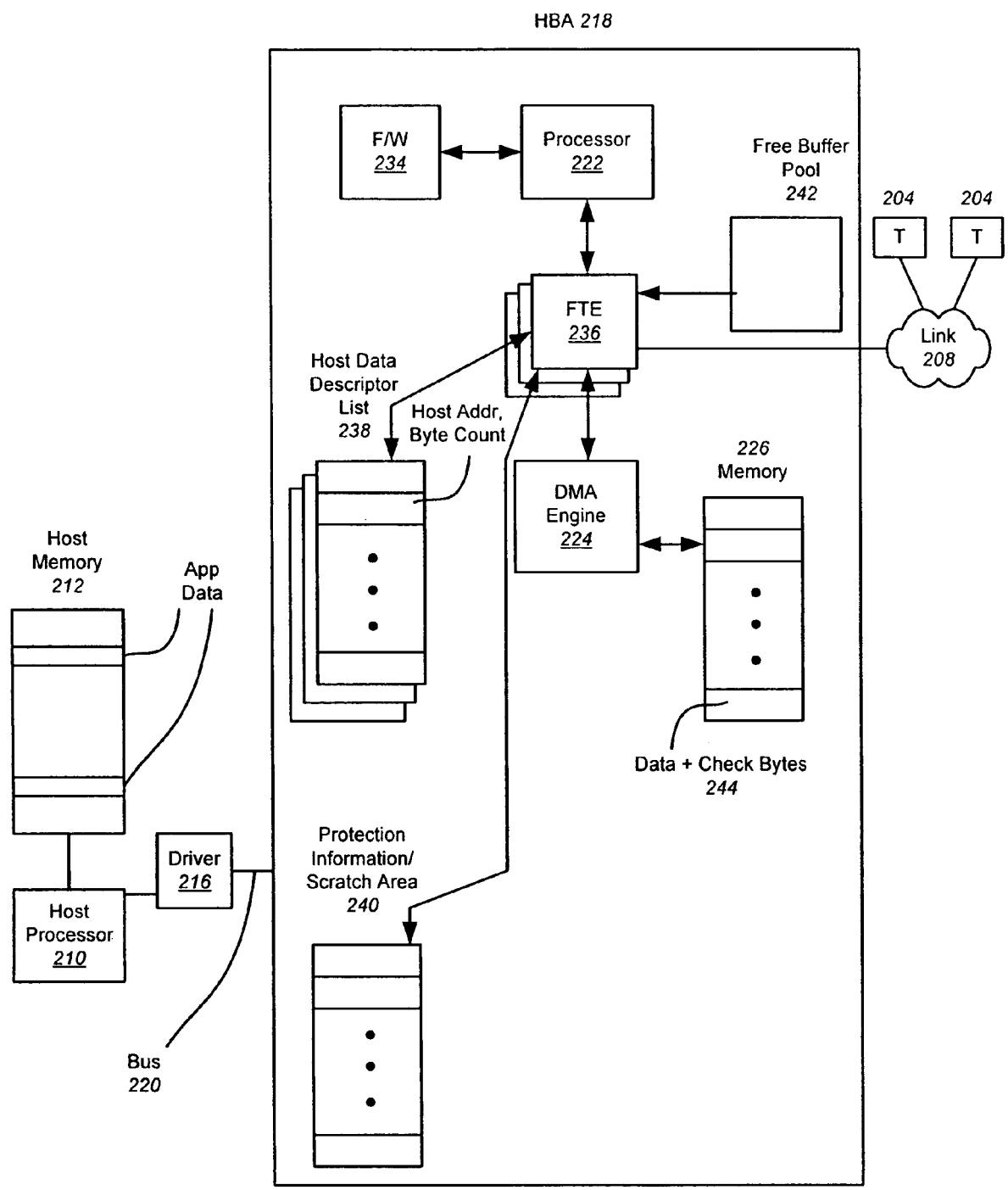
FIG. 2 illustrates an exemplary system for transferring data between a host computer and targets over a communications network according to embodiments of the invention.

FIG. 2 illustrates an exemplary system 200 for transferring data between a host computer and targets over a communications network according to embodiments of the invention. In FIG. 2, a host computer 202 is capable of sending or receiving data to and from targets 204 connected over a communications network 206 such as a SAN. The communications link 208 that enables communications between the host computer 202 and the targets 204 may operate under any frame-based networking protocol such as FC.

The host computer 202 typically includes a host processor 210, host memory 212 for storing application data 214, and a driver 216 for communicating with an IOC or an HBA 218 using a computer system bus 220 such as PCIe. The HBA 218 provides connectivity between the host computer 202 and the targets 204, and typically includes firmware 234 and a local processor 222 such as an ARM processor. In addition, the HBA 218 may also include one or more frame transmit engines 236, a DMA engine 224, and local memory 226.

In embodiments of the invention, one or more frame transmit engines 236 are coupled between the local processor 222 and the DMA engine 224. Each frame transmit engine 236 is associated with a particular sequence of frames to be sent to or received from a particular target 204, may be comprised of hardware, and may offload the local processor 222 by performing functions in hardware that would otherwise have to be performed by the local processor, such as identification of the type of data protection for a particular sequence of frames, identifying the data to read from host memory 212 in view of the type of data protection, and where the check bytes are to be placed in the local memory 226 along with the actual data.

A separate host data descriptor list 238 may be utilized by each frame transmit engine 236 to determine the host addresses and byte count of application data to be read from, or written to, host memory 212. The host data descriptor lists 238 may be stored in RAM in the HBA 218. Each host data descriptor list 238 is associated with a particular sequence of frames to be sent to or received from a particular target 204, and may contain a plurality of entries or host descriptors 246, each entry associated with a unique host address and byte count for data to be read from or written to host memory 212. The host data descriptor lists 238 may be programmed by the local processor 222 when a read or write request is received. The host addresses and byte count information are passed from the application 214 to the driver 216 and then to the local processor 222, which then writes the information into the appropriate host data descriptor list 238. Note that the frame transmit engines 236 and host data descriptor lists 238 allows the local processor 222 to be abstracted to a higher level where it does not need to keep track of the host address and byte count of data to be read or written.

The frame transmit engines 236 also utilize a free buffer pool 242, which contains pointers to free frame buffers 244 in the local memory 226 that are capable of storing both the data and check bytes for a single frame. The free buffer pool 242 helps each frame transmit engine 236 fill up the local memory 226 when a new frame buffer 244 is needed. As the data expands, more frame buffers can be fetched to keep storing the data. This frees the processor from having to calculate the exact memory locations into which data will be stored, and when to switch to a new location. Note that in previous implementations, the buffers in local memory were managed by the local processor, and the allocation of locations in memory for frame buffering was managed using a buffer pool which was in turn managed by the local processor. In embodiments of the invention, the allocation of locations in local memory 226 for frame buffering is implemented in each frame transmit engine 236.

A protection information/scratch area 240 in RAM in the HBA 218 stores configuration information for each host data descriptor list 238, which may include the protection scheme (e.g. a cyclic redundancy check (CRC)), the size of the data unit (block size) to be protected by each group of one or more check bytes generated in accordance with the protection scheme, and the frame size (because different sequences and targets may have different frame sizes). The protection information/scratch area 240 may contain the same number of entries as there are host data descriptor lists 238, one for each sequence of frames to be transmitted to a particular target 204. The protection information/scratch area 240 may be utilized by the global DMA engine 224 to determine the configuration information for the data to be read or written. The protection scheme may identify how check bytes are to be generated and where they are to be inserted. Information identifying multiple protection schemes, including, but not limited to, the T10 protection information standard, may be stored in the protection information/scratch area 240. For example, embodiments of the invention may support multiple check byte or DIF types, including standard DIFs (T10 DIFs), legacy DIFs (pre-standard customer formats), and proprietary DIFs (customer-specific formats). In some instances, the configuration information may direct the DMA engine 224 to strip off some protection data, which may be needed when communicating with legacy targets that are not able to handle check bytes.

The global DMA engine 224 may also utilize the protection information/scratch area 240 as a scratch area because of the potential independence of size of the data being accessed from host memory and the size of the frames to be transmitted. Because of these size differences, the data retrieved from host memory may not completely fill a frame buffer. In addition, because of the inserted check bytes, the data retrieved from host memory may spill over into the next frame buffer. Thus, the protection information/scratch area 240 may store scratch area information such as the ending point of the data in a particular entry, thereby identifying the next location at which to write. To program the protection information/scratch area 240, the firmware 234 determines from the host command the protection scheme for the data to be read or written, and stores this information in the appropriate entry in the protection information/scratch area.

The DMA engine 224 may be comprised of hardware, and operates under the control of the frame transmit engines 236 to perform data transfers to and from the host memory 212 without intervention from the host processor.

In the case of a write operation to write data to a target, an application running on the host computer 202 first sends a command to the driver 216, indicating that a write operation for host data is requested. The driver 216 then sends the write request over bus 220 to the firmware 234 in the HBA 218. The firmware 234 then determines from the host processor 210 the host addresses at which the data resides and the size of the data to be read from those addresses, and stores this information into the host data descriptor list 238 associated with the target.

The appropriate frame transmit engine 236 is then initiated by the firmware 234 to perform the autonomous mapping of protected data into frames. The frame transmit engine 236 reads the appropriate host data descriptor list 238 to determine the locations of the data to be read and the byte count. It issues command to let DMA engine 224, reads the information in the appropriate entry of the protection information/scratch area 240 to determine the protection scheme for that data and the frame size to be filled, and determines one or more free frame buffers from the transmit free buffer pool 242. Then the DMA engine 224 reads the appropriate data from host memory 212 in accordance with each host descriptor issued by frame transmit engine 236, one at a time, calculate the check bytes, insert the check bytes in the appropriate places alongside the data (one ore more check bytes for each protected data unit), and store the data and check bytes into the free frame buffers in local memory 226. As will be discussed in further detail below, the frame transmit engine 236 also generates and stores the header information for that frame into a separate area of local memory, and then combines the header, data and check bytes for transmission over the network. In other words, embodiments of the invention allow information to be directly handed over to hardware for further processing instead of involving the processor 222.

In some cases, the target may impose a limit on the amount of data it can receive in one burst (burst length). If the target specifies a burst length, the burst length is translated to the host byte count by the DMA engine 224 and sent back to the frame transmit engine 236 under protection mode, which then must take this limit into account when determining how much data and associated check bytes to transmit to the target.

In the case of a read operation (by the host), the same steps are performed by the frame transmit engine 236 in the HBA 218 of the target device 204. In this case, the roles of the host and target devices are reversed, and the frame transmit engine (in the target device 204) will transmit data from the target to the host, just as it transmits data from host to target in the case of a write (of host data to target device).

Accordingly, embodiments of the present invention provide several advantages to the system 200. By offloading the local processor 222 from having to perform the tasks needed to process outgoing traffic, and raising the level of abstraction at which the processor operates for outbound data streams, the mapping of protected data into frames can be performed at speeds that allow for system data rates of 8 Gbits/sec or more to be achieved. In addition, this significantly frees the processor to perform other tasks.

Figure 3:
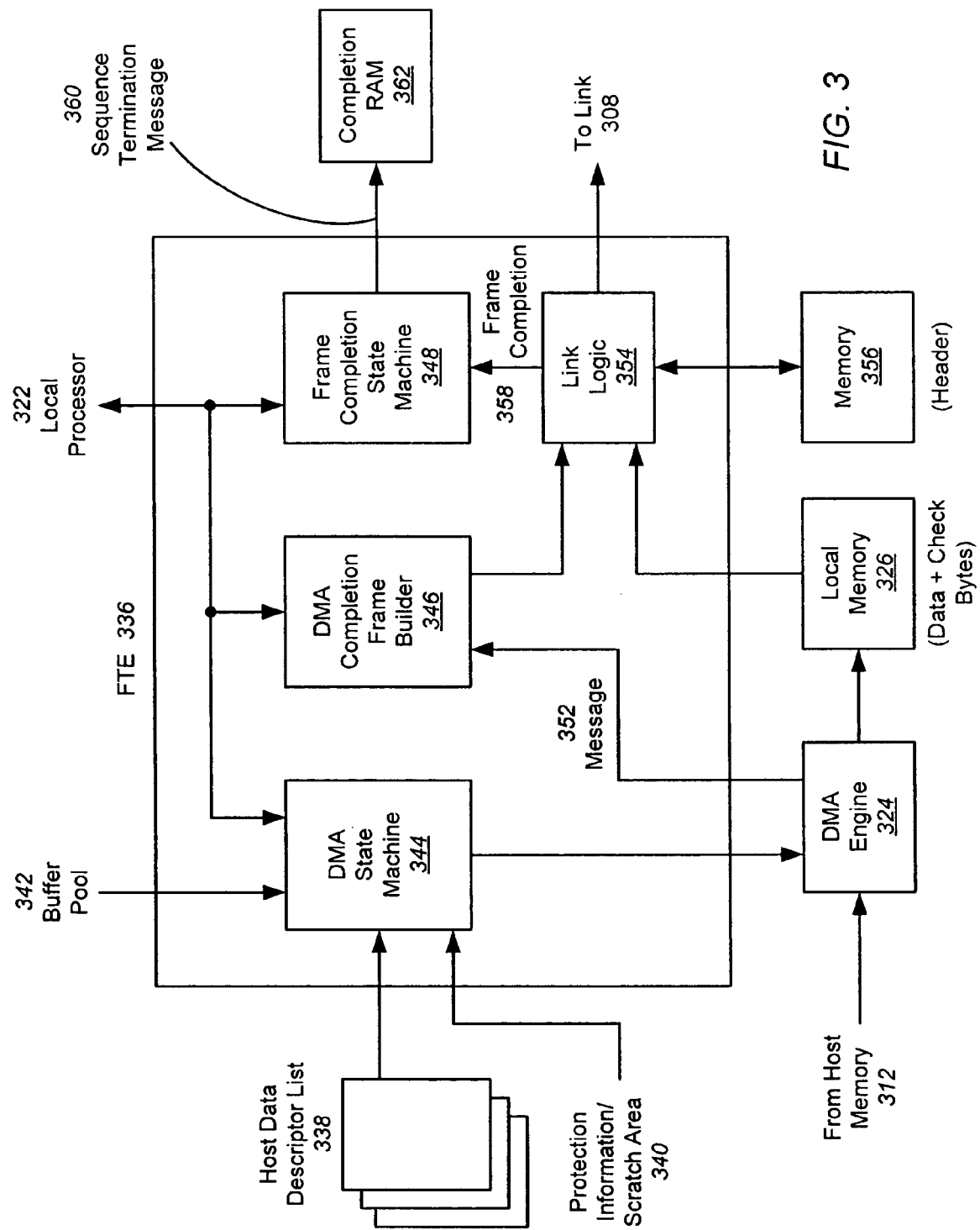
FIG. 3 illustrates an exemplary frame transmit engine according to embodiments of the invention.

FIG. 3 illustrates an exemplary frame transmit engine 336 according to embodiments of the invention. As mentioned above, the frame transmit engine 336 may offload the local processor by performing functions in hardware that would otherwise have to be performed by the local processor, such as identification of the type of data protection, identifying the data to read from host memory in view of the type of data protection, and where the check bytes are to be placed in the local memory 326 along with the actual data.

The frame transmit engine 300 includes a DMA state machine 344, a DMA completion frame builder 346, a frame completion state machine 348, and link logic 354. All of these blocks may be implemented in hardware using conventional logic structures well-understood by those skilled in the art. When so instructed by the local processor 322, the DMA state machine 344 reads the appropriate host data descriptor list 338 to determine the host addresses and byte count of application data to be read from, or written to, host memory 312, reads the configuration information and frame size from the protection information context/scratch area 340, and identifies one or more free frame buffers from the free buffer pool 342. In the case of a write operation, the DMA state machine 344 then triggers the DMA engine 324 to read the data from host memory 312, compute the check bytes, insert the check bytes into their proper order within the data, and store the data and check bytes in the free frame buffers in the local memory 326. Note that the check bytes and real data to be stored may be larger or smaller than a frame buffer size, so more than one frame buffer may be needed.

Each time the data for a single frame has been successfully moved into the local memory 326, the DMA engine 324 sends a message 352 to the DMA completion frame builder block 346 within the frame transmit engine 336. The DMA completion frame builder block 346 then generates a header for the frame being built and sends a command to link logic 354 to store the header in a separate memory 356 reserved for frame headers, and send out the completed frame. Note that the location of the header in the separate memory 356 is specified by the same pointer in the free buffer pool 342 that points to the location in local memory 326 at which the data and check bytes are stored. Thus, the command includes the pointer specifying where the header should be stored in separate memory 356. It should be understood that previously, the header for every frame was generated by the local processor, but in embodiments of the invention, the processor is further abstracted and need not deal with header generation. After the header has been stored in local memory 356, the link logic 354 uses the pointer to locate the header, data and check bytes, assembles the complete frame, and sends the completed frame out over the link 308. A frame completion message 358 is then sent from the link logic 354 to frame completion state machine 348.

Note that because a sequence may include multiple frames, the completion of a frame may not signify the end of the sequence. There are also a number of conditions that can terminate a sequence, including completion of all frames, reaching the burst length limit, and the like. When the frame completion state machine 348 determines that a sequence has been terminated, it sends a message 360 to a local processor completion RAM 362, indicating that the sequence associated with the frame transmit engine 336 has been terminated. A separate location in the local processor completion RAM 362 is available to store sequence completions for each frame transmit engine 336. The local processor 322 may subsequently read the local processor completion RAM 362 to determine that the sequence has been terminated. When the termination of a sequence is detected, the local processor 322 may perform several actions, depending on why the sequence was terminated. If the sequence was completed, the local processor 322 may report back to the host driver that the sequence has been completed. If the sequence was terminated prior to completion, but more data needs to be sent, the local processor 322 may send a command back to the host, requesting more data.

If an error is detected in the PCIe interface, memory, or link, the frame transmit engine 336 may allow all outstanding tasks to complete, put all buffers back into the free buffer pool, and issue a completion to the local processor, indicating that an error occurred. The actual steps taken may depend on what stage the data transfer process is in at the time of an error. For example, if a termination is issued, any data that has been delivered to the local memory through a DMA process but not sent out over the link may be prevented from being sent out, and the buffers would be reset. However, if frames are already queued up, those frames may be sent out even though the sequence is being terminated.

If a certain number of frames have been sent out and a link error is generated from the link logic, the local processor may direct the frame transmit engine to continue to send out one or more frames. However, because the check bytes are a function of the data that came before, it may not be possible to re-generate the check bytes. Therefore, in embodiments of the invention, a replay feature may be implemented in which the generation of the sequence is re-started from scratch, but the previously transmitted frames will be dropped, and only the subsequent frames will be transmitted.

In addition, while the frame transmit engine 336 is processing data, if the driver indicates that this processing should cease, the firmware can terminate the operation in a manner similar to the detection of an error.

Figure 4:
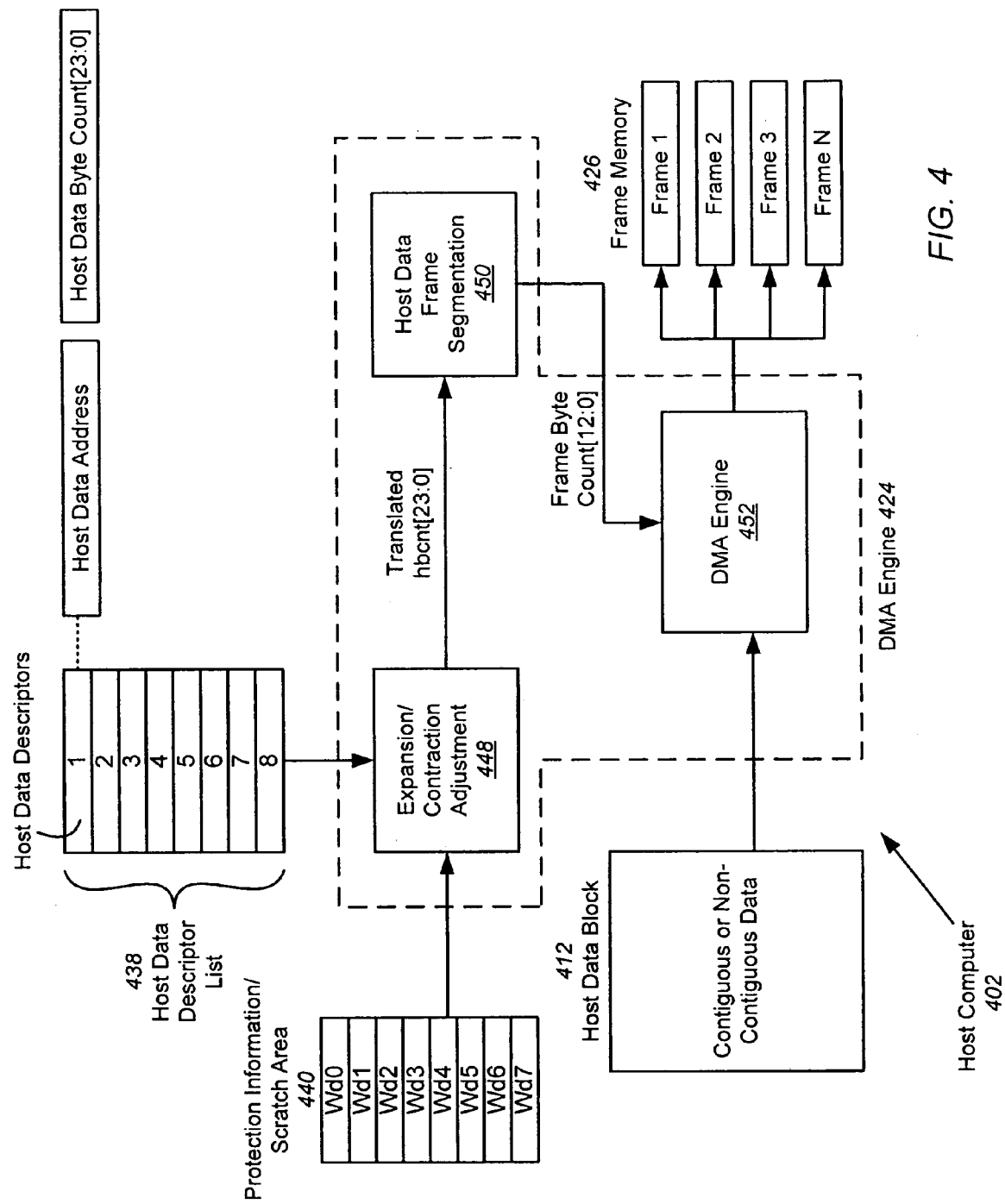
FIG. 4 illustrates another exemplary representation of a host computer according to embodiments of the invention.

FIG. 4 illustrates another exemplary representation of a host computer 402 according to embodiments of the invention. For simplicity, FIG. 4 shows only a single host data descriptor list 438, a protection information context/scratch area 440, frame memory 426 (local memory), a host data block 412 (host memory), and a DMA engine 424 which includes an expansion/contraction adjustment functional block 448, a host data frame segmentation functional block 450, and a DMA controller 452. The host data frame segmentation functional block 450 controls the accessing of frame buffers from the free buffer pool as frames are filled with real data and check bytes.

The expansion/contraction adjustment functional block 448 performs several functions with regard to the processing of data when the target sends a burst length message back to the frame transmit engine 436 to pause the transmission of data. For example, the burst length is translated into a frame count so that the transmission of frames can be paused at the proper point in the sequence, and the amount of data to be transferred is determined given the number of DIFs that need to be inserted or deleted and the burst length.

Figure 5:
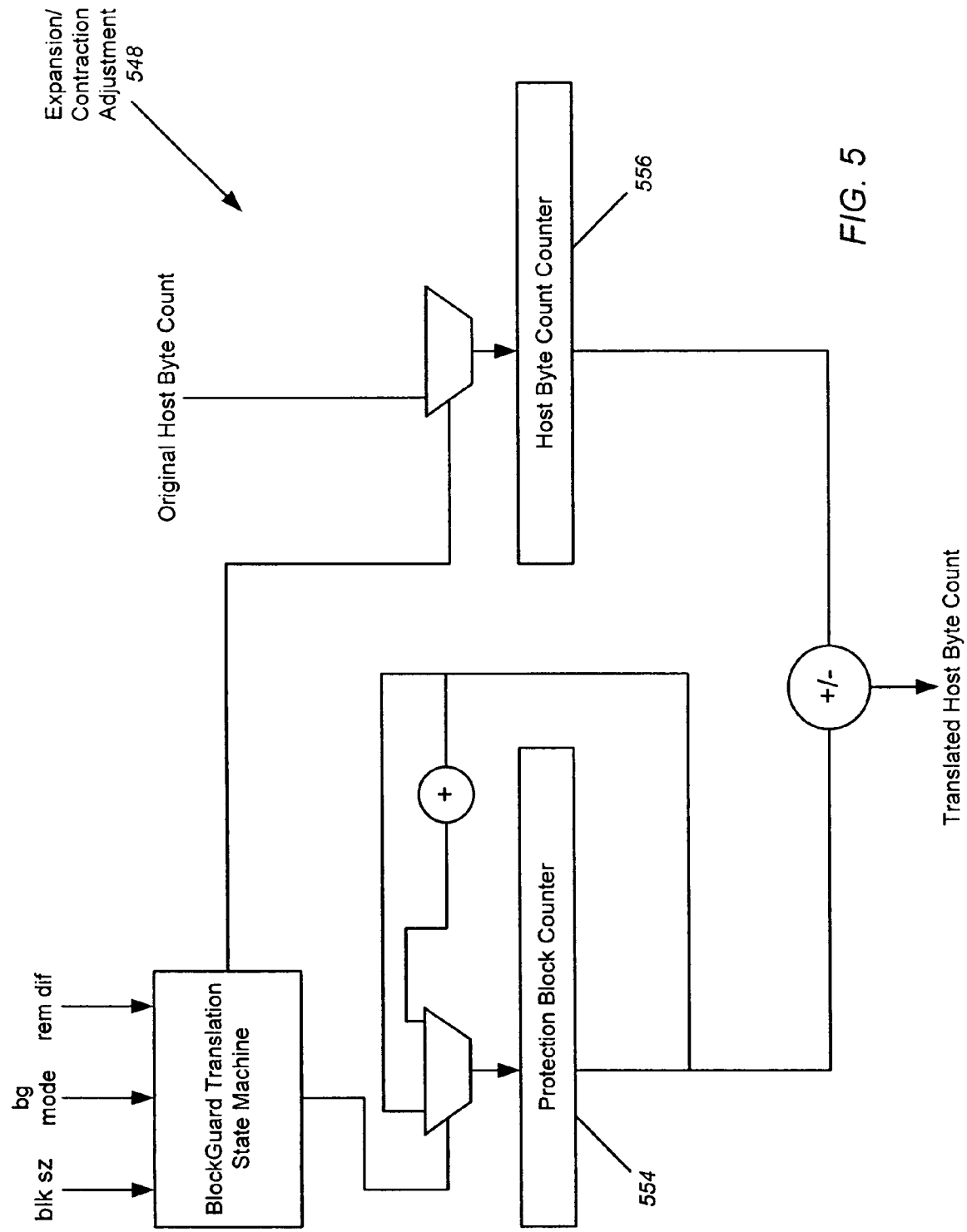
FIG. 5 illustrates an exemplary expansion/contraction adjustment block according to embodiments of the invention.

FIG. 5 illustrates an exemplary expansion/contraction adjustment block 548 according to embodiments of the invention. In order to offload the processor from having to calculate the expansion or contraction of the data stream due to the addition or deletion of protection information, the hardware must make the necessary adjustments to processor programmed values. This is accomplished by keeping two counters. Counter 554 tracks how many DIFs will be added or subtracted from the data stream, and counter 556 tracks how many protected blocks are contained in the stream. Once this is known, the proper number of DIFs can be added/subtracted from the programmed value. This new value is used to track the amount of host data plus DIFs that will finally end up in the transmitted frames.

Figure 6:
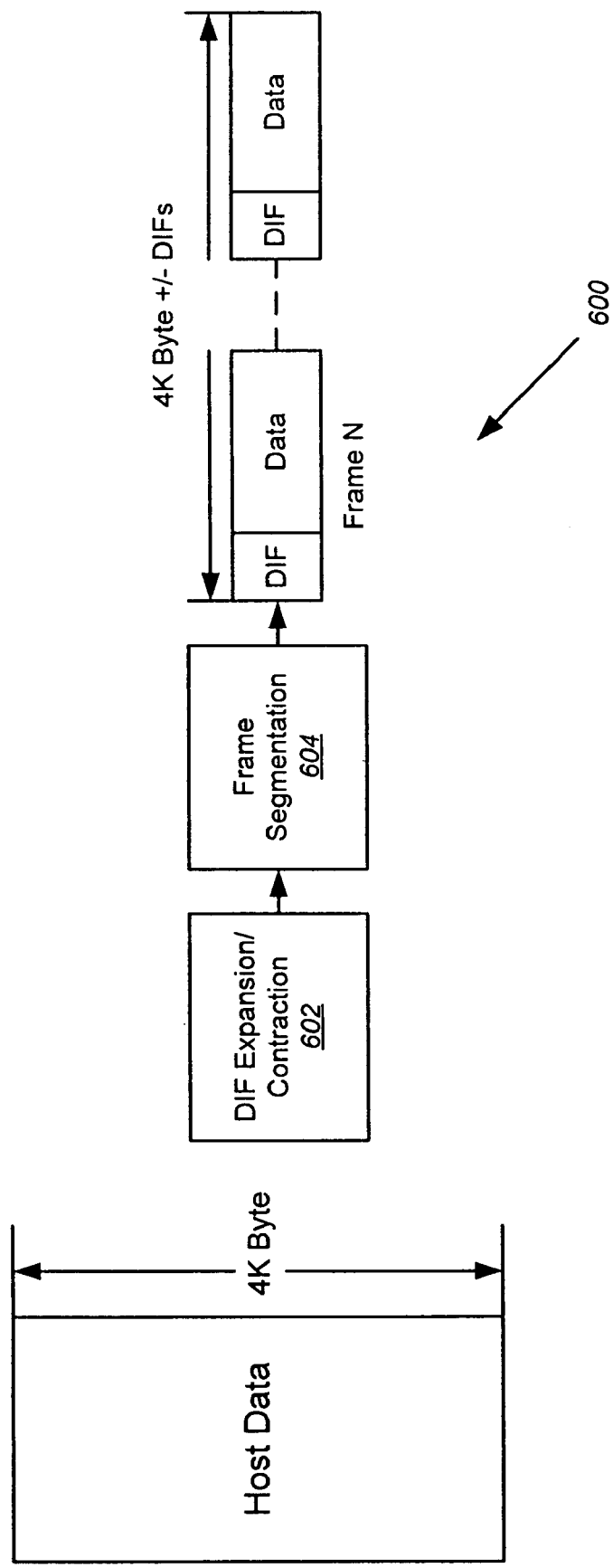
FIG. 6 illustrates an exemplary block diagram of the DIF expansion/contraction and frame segmentation functions according to embodiments of the invention.

FIG. 6 illustrates an exemplary block diagram 600 of the DIF expansion/contraction 602 and frame segmentation 604 functions according to embodiments of the invention. Each host descriptor in a host descriptor list can specify a certain amount (e.g. up to 16 Mbytes) of data. In the example of FIG. 6, 4 kbytes of host data is specified. After translation, the data specified by the host descriptors need to further be processed and segmented into frame size elements. The frame size is a variable supplied by the processor and can vary (e.g. 4 to 2 Kbytes). A certain number of streams of data can be active at any given time and each stream can have a unique frame size.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An apparatus for transmitting data between a host and a target over a frame-based communications network, comprising:
   a local processor configured for receiving a data transmission request from the host or the target to transmit data over the frame-based communications network;
   one or more hardware-based frame transmit engines coupled to the processor, each frame transmit engine configured for, in response to the request received at the processor, automatically mapping the data into frames to be transmitted without involving the processor, wherein each frame transmit engine is further configured for:
   determining one or more addresses, byte counts and a protection scheme of the data to be transmitted in a particular sequence of frames,
   determining a frame size of the frames to be transmitted,
   determining one or more free frame buffers for storing the frames prior to transmission,
   generating and storing headers for the frames to be transmitted, and
   combining the headers, data and check bytes determined by the protection scheme into the frames for transmission over the network; and
   a direct memory access (DMA) engine coupled to the one or more frame transmit engines and configured for reading the data to be transmitted in accordance with the addresses and byte counts determined by one of the frame transmit engines, calculating the check bytes for the data in accordance with the protection scheme, and storing the data and check bytes into the one or more free frame buffers in a local memory accessible to the processor.

2. The apparatus of claim 1, further comprising one or more host data descriptor lists, each host data descriptor list accessible to each frame transmit engine and configured for storing the addresses and byte counts of the data to be transmitted.

3. The apparatus of claim 2, further comprising a protection information/scratch area accessible to the one or more frame transmit engines for storing the frame size and protection scheme of the data to be transmitted.

4. The apparatus of claim 3, further comprising a free buffer pool accessible to the one or more frame transmit engines for identifying the one or more free frame buffers.

5. The apparatus of claim 4, each frame transmit engine comprising a DMA completion frame builder configured for receiving a frame completion message from the DMA engine and generating a header for a frame to be transmitted.

6. The apparatus of claim 5, each frame transmit engine comprising link logic configured for receiving the header from the DMA completion frame builder, storing the header in a location specified by a free frame buffer, assembling a completed frame with the header, data and check bytes, and sending the completed frame out over the communications network.

7. The apparatus of claim 6, each frame transmit engine comprising a frame completion state machine configured for receiving the frame completion message from the link logic and sending a message to the local processor—when the sequence of frames being handled by the frame transmit engine is to be terminated.

8. The apparatus of claim 3, each frame transmit engine comprising a DMA state machine configured for reading an appropriate host data descriptor list to determine the addresses and byte counts of the host data to be transmitted, and reading the protection information/scratch area to determine the protection scheme and frame size of the data to be transmitted.

9. A host bus adapter (HBA) comprising the apparatus of claim 1.

10. A host computer comprising the HBA of claim 9.

11. A storage area network (SAN) comprising the host computer of claim 10.

12. A method for transmitting data between a host and a target over a frame-based communications network, the host coupled to a host bus adapter including a local processor and a frame transmit engine coupled thereto, the frame transmit engine configured to automatically map the data into frames to be transmitted without any involvement of the local processor, the frame transmit engine further configured to perform the method comprising:
   determining one or more addresses and byte counts of the data to be transmitted in a particular sequence of frames, determining a protection scheme and a frame size of the host data to be transmitted in the particular sequence of frames, and determining one or more free frame buffers for storing the frames prior to transmission;
   communicating with a direct memory access (DMA) engine configured for reading the data to be transmitted in accordance with the determined addresses and byte counts, calculating check bytes for the data in accordance with the protection scheme, and storing the data and check bytes into the one or more free frame buffers;
   generating and storing headers for the frames to be transmitted; and
   combining the headers, data and check bytes into the frames for transmission over the network.

13. The method of claim 12, wherein the host bus adapter further comprises firmware configured to initiate the frame transmit engineers to perform automatic mapping of the data into the frames without involving the processor.

14. The method of claim 13, further comprising determining the addresses and byte counts of the data to be transmitted in the particular sequence of frames from a host data descriptor list accessible to the frame transmit engine.

15. The method of claim 14, further comprising determining the protection scheme and the frame size of the data to be transmitted in the particular sequence of frames from a protection information/scratch area accessible to the frame transmit engine.

16. The method of claim 15, further comprising determining the one or more free frame buffers for storing the frames prior to transmission from a free buffer pool accessible to the frame transmit engine.

17. The method of claim 15, further comprising storing the frame size and the protection scheme for the data in the protection information/scratch area.

18. The method of claim 14, further comprising storing the addresses and byte counts for the data into the host data descriptor list.

19. The method of claim 13, further comprising sending a sequence termination message to the local processor when the transmission of the sequence of frames is to be terminated.

20. The apparatus of claim 1, further comprising firmware configured to initiate the frame transmit engineers to perform automatic mapping of the data into the frames without involving the processor.

* * * * *